US009554049B2

(12) United States Patent
Tobin

(10) Patent No.: US 9,554,049 B2
(45) Date of Patent: Jan. 24, 2017

(54) GUIDED VIDEO CAPTURE FOR ITEM LISTINGS

(71) Applicant: John Patrick Edgar Tobin, San Jose, CA (US)

(72) Inventor: John Patrick Edgar Tobin, San Jose, CA (US)

(73) Assignee: eBay Inc., San Jose, CA (US)

(*) Notice: Subject to any disclaimer, the term of this patent is extended or adjusted under 35 U.S.C. 154(b) by 0 days.

(21) Appl. No.: 13/693,891

(22) Filed: Dec. 4, 2012

(65) Prior Publication Data

US 2014/0152875 A1 Jun. 5, 2014

(51) Int. Cl.
*H04N 5/222* (2006.01)
*G06K 9/62* (2006.01)
*G06K 9/64* (2006.01)
*G06K 9/68* (2006.01)
*G06K 9/00* (2006.01)
*H04N 5/232* (2006.01)

(52) U.S. Cl.
CPC ...... *H04N 5/23293* (2013.01); *H04N 5/23222* (2013.01)

(58) Field of Classification Search
CPC .... G06F 3/005; G06F 3/04883; H04N 5/2256; H04N 5/23216; H04N 5/23222; H04N 5/23293; H04N 5/232; H04N 5/23219; H04N 5/23229; G06T 2207/10016; G06K 9/32; G06K 9/6202; G06K 9/6267
USPC ................. 348/333.01–333.13; 382/100–154
See application file for complete search history.

(56) References Cited

U.S. PATENT DOCUMENTS

| 6,222,538 B1 * | 4/2001 | Anderson ...................... 715/709 |
| 6,677,969 B1 * | 1/2004 | Hongo ........................... 715/863 |
| 7,924,318 B2 * | 4/2011 | Hasegawa et al. .......... 348/211.8 |
| 8,165,401 B2 | 4/2012 | Funayama |
| 8,289,433 B2 * | 10/2012 | Hara et al. ................ 348/333.02 |
| 8,385,607 B2 * | 2/2013 | Okada ............................ 382/118 |
| 8,843,980 B1 * | 9/2014 | Cai ..................... H04N 21/2743 725/105 |
| 9,064,184 B2 | 6/2015 | Ruan |
| 2005/0071257 A1 | 3/2005 | Giannini |
| 2006/0251384 A1 * | 11/2006 | Vronay ................. G11B 27/034 386/242 |
| 2007/0025723 A1 * | 2/2007 | Baudisch et al. ............. 396/287 |
| 2007/0172151 A1 * | 7/2007 | Gennetten et al. ........... 382/299 |

(Continued)

OTHER PUBLICATIONS

U.S. Appl. No. 13/526,282, filed Jun. 18, 2012, Normalized Images for Item Listings.

(Continued)

*Primary Examiner* — Chia-Wei A Chen
(74) *Attorney, Agent, or Firm* — Schwegman, Lundberg & Woessner, P.A.

(57) ABSTRACT

Disclosed in some examples is a method of guided video capture, the method including identifying a video capture template, the video capture template including a plurality of target video parameters, each of the target video parameters corresponding to one of a plurality of video capture directions; while capturing video, selecting a video capture direction from the plurality of video capture directions based on video parameters of captured video and the plurality of target video parameters using a processor and presenting the selected video capture direction to a user on a display device.

30 Claims, 8 Drawing Sheets

(56) References Cited

U.S. PATENT DOCUMENTS

| | | | |
|---|---|---|---|
| 2007/0274703 A1* | 11/2007 | Matsuda | 396/264 |
| 2007/0296830 A1 | 12/2007 | Smith et al. | |
| 2008/0030599 A1* | 2/2008 | Stavely et al. | 348/239 |
| 2008/0055453 A1* | 3/2008 | Battles et al. | 348/333.05 |
| 2008/0068487 A1* | 3/2008 | Morita | 348/333.05 |
| 2008/0193101 A1* | 8/2008 | Agnihotri | G11B 27/28 386/290 |
| 2008/0266294 A1* | 10/2008 | Osman | G01B 11/2513 345/426 |
| 2008/0313140 A1* | 12/2008 | Pereira | G06F 17/30858 |
| 2009/0086993 A1* | 4/2009 | Kawaguchi et al. | 381/92 |
| 2009/0280897 A1* | 11/2009 | Fitzmaurice et al. | 463/30 |
| 2009/0310851 A1* | 12/2009 | Arcas | G06T 7/0065 382/154 |
| 2010/0141781 A1* | 6/2010 | Lu | 348/222.1 |
| 2010/0177234 A1* | 7/2010 | Ogura et al. | 348/333.03 |
| 2010/0217684 A1 | 8/2010 | Melcher et al. | |
| 2010/0245532 A1* | 9/2010 | Kurtz et al. | 348/14.03 |
| 2010/0266206 A1* | 10/2010 | Jo et al. | 382/190 |
| 2010/0293106 A1* | 11/2010 | Rhoads | G06Q 30/02 705/330 |
| 2010/0302393 A1* | 12/2010 | Olsson et al. | 348/222.1 |
| 2011/0008036 A1* | 1/2011 | Takatsuka et al. | 396/283 |
| 2011/0148857 A1* | 6/2011 | Krupka et al. | 345/419 |
| 2011/0222787 A1* | 9/2011 | Thiemert | G06F 17/30802 382/225 |
| 2011/0243397 A1* | 10/2011 | Watkins et al. | 382/118 |
| 2011/0311100 A1* | 12/2011 | Fan | 382/103 |
| 2012/0002019 A1* | 1/2012 | Hashimoto | H04N 13/0221 348/50 |
| 2012/0009555 A1* | 1/2012 | Hanina et al. | 434/262 |
| 2012/0099000 A1* | 4/2012 | Kim | 348/231.99 |
| 2012/0237178 A1* | 9/2012 | Ishii et al. | 386/224 |
| 2012/0257797 A1* | 10/2012 | Leyvand | G06K 9/00221 382/118 |
| 2012/0284625 A1* | 11/2012 | Kalish | G11B 27/034 715/723 |
| 2012/0316676 A1* | 12/2012 | Fouillade et al. | 700/246 |
| 2013/0033615 A1* | 2/2013 | Ecrement | 348/222.1 |
| 2013/0038759 A1* | 2/2013 | Jo et al. | 348/240.99 |
| 2013/0083215 A1 | 4/2013 | Wisniewski | |
| 2013/0201301 A1* | 8/2013 | Huang | H04N 13/0221 348/50 |
| 2013/0234927 A1* | 9/2013 | Roh | 345/156 |
| 2013/0258117 A1* | 10/2013 | Penov et al. | 348/207.1 |
| 2013/0272673 A1* | 10/2013 | Swearingen et al. | 386/224 |
| 2013/0286238 A1* | 10/2013 | Tan et al. | 348/222.1 |
| 2013/0336523 A1 | 12/2013 | Ruan | |
| 2014/0003523 A1* | 1/2014 | Soroushian | H04N 19/597 375/240.16 |
| 2014/0056479 A1* | 2/2014 | Bobbitt | G06K 9/00718 382/104 |
| 2014/0118519 A1* | 5/2014 | Sahin | 348/77 |
| 2014/0273937 A1* | 9/2014 | Hyde et al. | 455/406 |
| 2014/0288954 A1* | 9/2014 | Hanina et al. | 705/2 |
| 2014/0289594 A1* | 9/2014 | Iampietro | G11B 27/105 715/202 |
| 2014/0293220 A1* | 10/2014 | Kornilov et al. | 351/204 |
| 2015/0281586 A1* | 10/2015 | Mate | H04N 1/21 348/240.99 |
| 2015/0287129 A1 | 10/2015 | Ruan | |
| 2015/0312652 A1* | 10/2015 | Baker | H04N 21/8549 386/281 |
| 2016/0055885 A1* | 2/2016 | Hodulik | G06K 9/00751 386/241 |

OTHER PUBLICATIONS

"U.S. Appl. No. 13/526,282, Non Final Office Action mailed May 13, 2014", 13 pgs.

"U.S. Appl. No. 13/526,282, Response filed Sep. 15, 2014 to Non Final Office Action mailed May 13, 2014", 13 pgs.

Dementhon, Daniel, et al., "Model-Based Object Pose in 25 Lines of Code", International Journal of Computer Vision, 15, (Jun. 1995), 123-141.

Fitzgibbon, Andrew, et al., "Microsoft Research 3D Video", http://research.microsoft.com/en-us/projects/3dvideo/ last visited Mar. 26, 2013, (Accessed Mar. 26, 2013), 1 pg.

Klypper, "About Klypper", http://klypper.com/aboutKlypper.html last visited Mar. 26, 2013, (Accessed Mar. 26, 2013), 1 pg.

Klypper, "Klypper appstore (1 of 2)", https://itunes.apple.com/us/app/klypper/id507436787?mt=8&ign-mpt=uo%3D4 last visited Mar. 26, 2013, (Accessed Mar. 26, 2013), 3 pgs.

Klypper, "Klypper appstore (2 of 2)", https://itunes.apple.com/us/app/klypper/id507436787?mt=8&ign-mpt=uo%3D4 last visited Mar. 26, 2013, (Accessed Mar. 26, 2013), 2 pgs.

Klypper, "Klypper Home", http://klypper.com/index.html last visited Mar. 26, 2013, (Accessed Mar. 26, 2013), 1 pg.

Klypper, "Klyps the new medium", http://klypper.com/creative-content.html (last visited Mar. 26, 2013), (Accessed Mar. 26, 2013), 2 pgs.

Lowe, David G, et al., "Object recognition from local scale-invariant features", The Proceedings of the Seventh IEEE International Conference on Computer Vision, 1999, vol. 2, (1999), 1150-1157.

"U.S. Appl. No. 13/526,282, Final Office Action mailed Oct. 1, 2014", 15 pgs.

"U.S. Appl. No. 13/526,282, Notice of Allowance mailed Feb. 20, 2015", 7 pgs.

"U.S. Appl. No. 13/526,282, Response filed Dec. 2, 2014 to Final Office Action mailed Oct. 1, 2014", 9 pgs.

"U.S. Appl. No. 14/743,707, Preliminary Amendment filed Jun. 19, 2015", 7 pgs.

* cited by examiner

GUIDED VIDEO CAPTURE FOR ITEM LISTINGS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc., All Rights Reserved.

BACKGROUND

Online marketplaces allow individuals or entities to buy and sell merchandise across a network such as the Internet. A key component in the online marketplaces is an item listing. Item listings describe features of the product and contain important information such as price, shipping or pickup details, acceptable forms and terms of payment, or the like. Typically, the item listing also contains a picture of the item or items.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
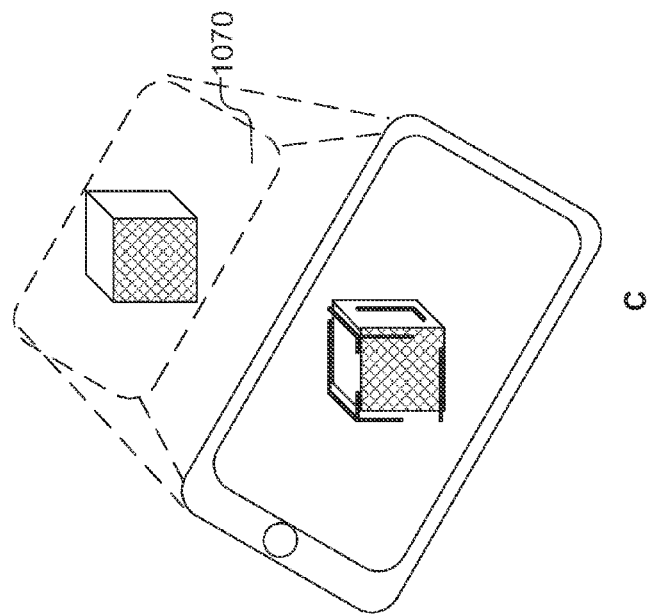
FIG. 1A shows example guided video captures according to some examples of the present disclosure.

The pictures which accompany an item listing typically convey a lot of information about the condition and quality of the merchandise being sold. However, the information conveyed is limited to the particular angle, lighting, quality, and other parameters that the seller chose. These limitations may interfere with the ability of the seller to properly represent the quality of their merchandise and may interfere with the buyer's ability to assess the same.

A video accompanying the listing may be more desirable as it may convey more information about the merchandise as it may show more angles and more details than easily done with traditional photo listings. Despite these benefits, taking quality videos may be difficult for many sellers. They may be confused about what angles of the product to show, what zoom levels to use, how long the video should last, and other video capture parameters. Casual sellers may also have no, or only very limited, video editing capabilities, making it even more challenging to produce a high quality finished product that properly captures the subject.

Disclosed in some examples are methods, systems and machine readable media which guide a user in creating a professional looking video describing a product. The system provides a template to the user which may direct the user as they are taking the video on professional looking adjustments to video parameters such as zoom, angles, rotation, panning, light locations and intensities, or the like to achieve a quality video describing an item. These templates may include predetermined video capture directions to the user that are overlaid over the viewfinder of the video capture device at the appropriate time and may be tailored to the product that the user is trying to capture.

Each template may contain a number of target video parameters and corresponding video capture directions. Video parameters may be any visual or audio property of the video and target video parameters may be any audio or visual parameters which may need to be achieved before a particular direction is displayed. For example, the target video parameters may include a time offset from the last direction or from the start of video capture. When the target video parameter is met by the captured video (e.g., when the time elapsed since the start of the captured video, or the time elapsed since the last direction has been reached) an associated video capture direction may be displayed. Other target video parameters may include orientations with respect to the item (e.g., the system recognizes that the user has captured a particular orientation of the item—say a side view or a top view), zoom levels, lighting levels and locations, panning sequences, audio capture requirements (e.g., a certain required sound—such as an engine roaring) or the like. The collection of directions in the template may form a video capture sequence or path. For example, the templates may be created by video professionals and may contain directions that, when followed, will lead to a professional looking video which captures key features of the product.

In some examples, the video capture directions in the templates may instruct the video capture device to overlay a three-dimensional item skeleton over the image in the viewfinder. The three-dimensional item skeleton may be a wire model, or some other three dimensional graphical representation or approximation of the item the user is trying to capture. This wire model may be animated in a defined sequence described by the directions in the template and the user capturing the video attempts to match the actual item in the viewfinder with the skeleton. The definition of the skeleton may be part of template (e.g., the first direction may be the parameters of the skeleton) or may be sent, or loaded, by the video capture device separately.

In some examples, the skeleton is animated by providing one or more directions in the form of transformations for the video capture device to apply to the skeletal model at particular time points (e.g., the corresponding target video parameter is a particular time) in the video capture. In yet other examples, the template may contain directions in the form of transformations and the target video parameters that trigger a particular skeletal transformation would be that the actual object in the video matches or is close to matching a particular displayed orientation of the skeletal representation of the object. Thus if the skeletal representation shows a profile view of the object, the skeletal representation of the object may not be updated with the next direction until the object in the video is displayed in profile that matches, or closely matches the desired profile. Whether or not the item being captured matches the orientation of the skeletal representation of the item may be determined by the user—e.g., the user may indicate when the proper view has been displayed, or it may be automatically determined by various computer vision (e.g., imaging processing) techniques performed in the video capture device, the image processing service, or a combination of the video capture device and the image processing service. Various example computer vision techniques are discussed later.

An example is shown in FIG. 1A where video capture device 1010 (in this case a smartphone) is taking video of an object 1020. An image of the object 1040 appears in the video capture device's preview or viewfinder 1030. The viewfinder is a substantially (e.g., less than 5 seconds latency) real time representation of the video that is being recorded displayed on a display (e.g., a Liquid Crystal Display). Skeletal model 1050 is shown overlaid over the image in the viewfinder. In "A" the skeletal model 1050 is directing the user to center the object a bit more to the left in the video frame by moving the video capture device 1010 slightly to the right. Moving the device right in order to move the object in the viewfinder left to match the skeletal representation might be confusing to some users as their first instinct may be to move the video capture device left. As a result, visual directions may also be displayed (e.g., "move the camera to the right") to assist users. In "B" the skeletal model 1050 is transformed by rotating the skeletal model clockwise 1060. This instructs the users to rotate the video capture device 1010 clockwise to match the skeletal model as shown in "C" at 1070.

Figure 1A:
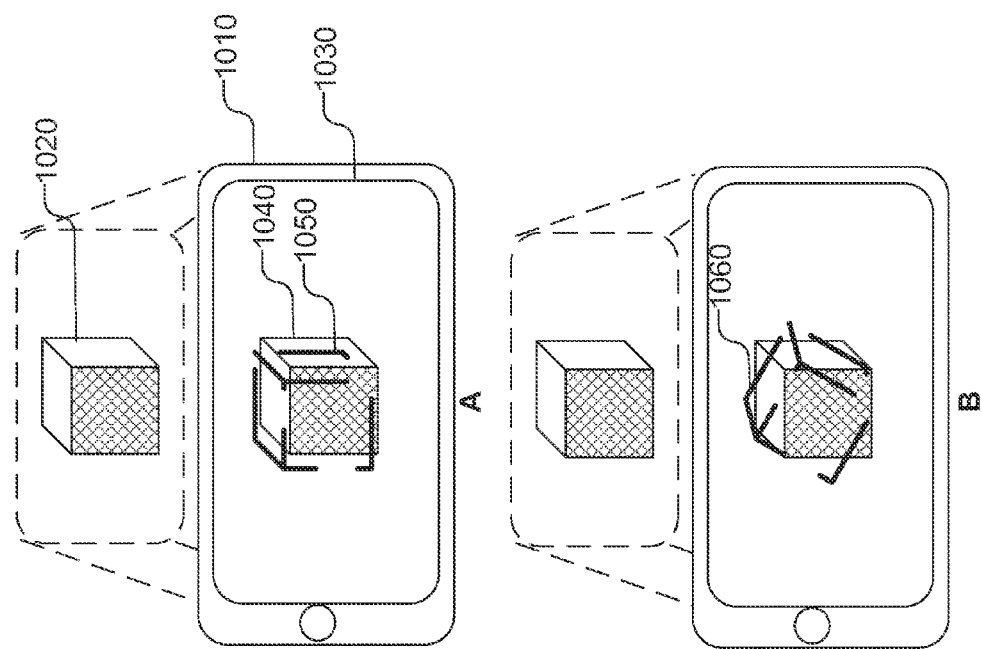
Figure 1B:
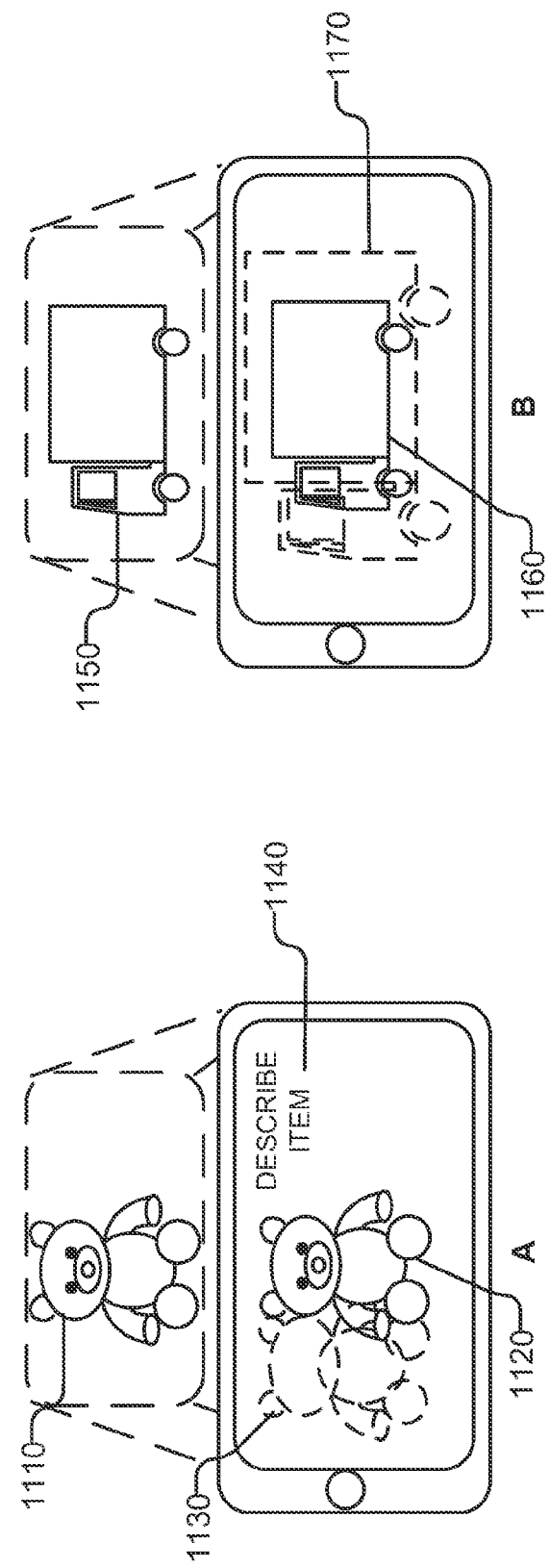
FIG. 1B shows example guided video captures according to some examples of the present disclosure.

FIG. 1B shows addition example video captures. Item 1110 shows an item (a stuffed bear) with its representation 1120 on the viewfinder display. Skeletal representation 1130 is shown guiding the user to move the camera right. Textual direction 1140 may be displayed 1140 instructing the user to verbally describe the item. Note that multiple directions may be displayed simultaneously. In "B" the truck 1150 is shown on the viewfinder 1160 and the skeletal representation 1170 is larger than the truck 1160 indicating that the user should zoom in or move closer to get a more detailed look at the truck.

Instead of, or in addition to transformations to the skeletal representation, the template may have directions in the form of text, signs, symbols, or the like. For example, textual directions may be overlaid on the viewfinder at the appropriate time to direct the user to "Turn Right," "Zoom in," "Show the interior of the car," or the like. Furthermore, video capture directions may include audio directions such as "start the car," or "talk about the object." In addition, a title may be displayed in the view finder which may display a video title, a particular sequence title of the video (e.g., "profile view"), and the like. These additional titles may provide more context to the user.

In some examples the various directions in the template may be successive—that is, the directions must be completed in a predetermined order (e.g., time based target video parameters). In other examples, the user may complete directions in any order. In these examples, if desired, the image processing system may splice (or edit) individual clips together into a finished video presentation.

The directions (e.g., the animated skeletal representation, textual directions, or the like) may be displayed anywhere on any display device which is communicatively coupled with the video capture device. In some examples, the directions may be drawn over the image in the viewfinder such that the directions are visible over the image in the viewfinder. The pixels from the viewfinder may be overwritten by the directions in the template information before being rendered to the display. For example, the viewfinder image and the directions may be seen as layers. The direction layer may have its alpha or transparency component set to 0 for all pixels where the directions (or the skeletal representation) are absent and 1 for all pixels corresponding to the directions (e.g., the skeletal representation or the text). For example, in FIG. 1, the lines showing the skeletal representation 1050, 1060 may have their alpha values set to 1, and the rest of the pixel values for that layer set to 0. The viewfinder image layer may have an alpha value of 1 for all pixels. The layers may then be composited by using an "OVER" operator. The direction layer is composited OVER the viewfinder layer. The over operator applies the formula: $C_o = C_a \alpha_a + C_b \alpha_b (1-\alpha_a)$ where $C_o$ is the result of the operation, $C_a$ is the color of the direction layer pixel, $C_b$ is the color of the viewfinder pixel, $\alpha_a$ and $\alpha_b$ are the alpha values of the pixels in the direction layer (a) and the viewfinder layer (b) respectively. Note that $\alpha_b$ is most likely one as the viewfinder image is not likely to have any transparency. Using the OVER function, the template directions may also have a transparency added which will increase visibility of the viewfinder image and decrease any obtrusiveness of the directions. Thus the lines 1050 and 1060 from FIG. 1 may have an alpha value of 0.5 which would create a transparent look to the directions, further increasing scene visibility.

While the specification has heretofore described the directions being displayed overlaid with the image on the viewfinder, in other examples the directions may be displayed in some other portion of a display (e.g., next to the viewfinder image, on a separate display, or the like).

In some examples, feedback indicators may be displayed indicating how close the user is to directions. For example, the user may be shown directions with respect to lighting levels and locations of lighting (e.g., to avoid distracting shadows). In other examples, the feedback may be related to how close the user is to the skeletal representation. This may be done with computer vision algorithms which may attempt to match the skeletal representation with the object or determine qualities about the object for comparison to expected qualities (e.g., to determine which pose the object is in compared to what pose the object should be in). For example, the system may employ a Pose from Orthography and Scaling with Iterations (POSIT) algorithm to estimate the orientation and "pose" that an item is in. POSIT is described by D. DeMenthon and L. S. Davis, "Model-Based Object Pose in 25 Lines of Code", International Journal of Computer Vision, 15, June 1995. In some examples these feedback indicators may be stored as metadata with the video being captured. Other computer vision techniques may also be employed such as edge detection, blog analysis, which may be used to determine the orientation of the subject with respect to the current camera angle.

The system may then determine video segments where the feedback indicators indicate less than ideal video capture. The system may prompt the user to recapture these particular segments. The system may then stitch together the various video segments to form one acceptable capture. For example, if the video capture sequence has portions A, B, and C and the user's first attempt is acceptable for segments A and C, and the user reshoots an acceptable segment B, a resulting video may be created containing segment A from the first video, segment B from the second video and then segment C from the first video. This resulting video then may be a composite of multiple videos selected based on how close the user followed the instructions provided. In other examples, this process may be done manually by the user—e.g., the user may determine which portions of the sequence are acceptable and which to reshoot based on their subjective assessment of the video.

In some examples other video editing tools are provided which make it easy for users to edit and submit these videos to a network commerce system such as splicing of multiple video streams into one video, creating a picture in picture experience, adjusting parameters of the video (e.g., brightness, contrast, removing shakiness, or the like).

The templates may be provided to users at any level of granularity desired. Thus, the system may provide one template for a particular category of item (car, boat, clothing, or the like) or may provide templates for more detailed subcategories (sedan, minivan, SUV, or the like) all the way to specific makes, models, trim packages, or the like. Using more detailed templates allows the videos to better match the product they are capturing.

In some examples, the system may determine which template to use based upon a user selection of the desired product. For example, the system may provide a list of products which the user may choose from. In other examples, the system may automatically determine the appropriate template based upon image recognition techniques. For example, the system may utilize various computer vision algorithms such as Scale Invariant Feature Transform (SIFT) which is disclosed in "Object recognition from local scale-invariant features" by David G. Lowe *Proceedings of the International Conference on Computer Vision* (1999), Speeded Up Robust Feature (SURF) described in U.S. Pat. No. 8,165,401 to Funayama, or other computer vision algorithms.

In some examples, the templates may also be customizable by the user. For example, the user may preview the particular template on their video capture device and make changes to the template as they see fit. In some examples, the video capture device may present a graphical editing interface to allow the user to alter the templates. For example, the graphical editing interface may allow users to specify locations on the skeletal model where the actual item represented by the skeletal model is damaged. The resulting template may include a shot of the damaged area to convey the damage to the buyer. In some examples, these customized templates may be uploaded to the image processing service for use again by the user that created it or by others. In further examples, customized templates provided by users may be reviewed and rated by other users of the image processing service.

In some examples and as heretofore described, some or all of the disclosed functionality may be implemented on a video capture device. A video capture device may be any computing device capable of presenting the directions in the template to the user and may include a mobile device (e.g., a smartphone, a tablet computer, a laptop computer, or the like), a desktop computer, a server computer, or the like. In other examples, some or all of the functionality may be provided by an image processing service accessible over a network. For example, the video capture device may send some data to the image processing service over a network for processing and receive the processed results from the image processing service. This may allow video capture devices with more limited processing power to utilize the disclosed functionality. Additionally, this may allow the system to utilize more powerful image algorithms which may require additional processing or may rely on large image training sets or collaborative concepts.

Figure 2A:
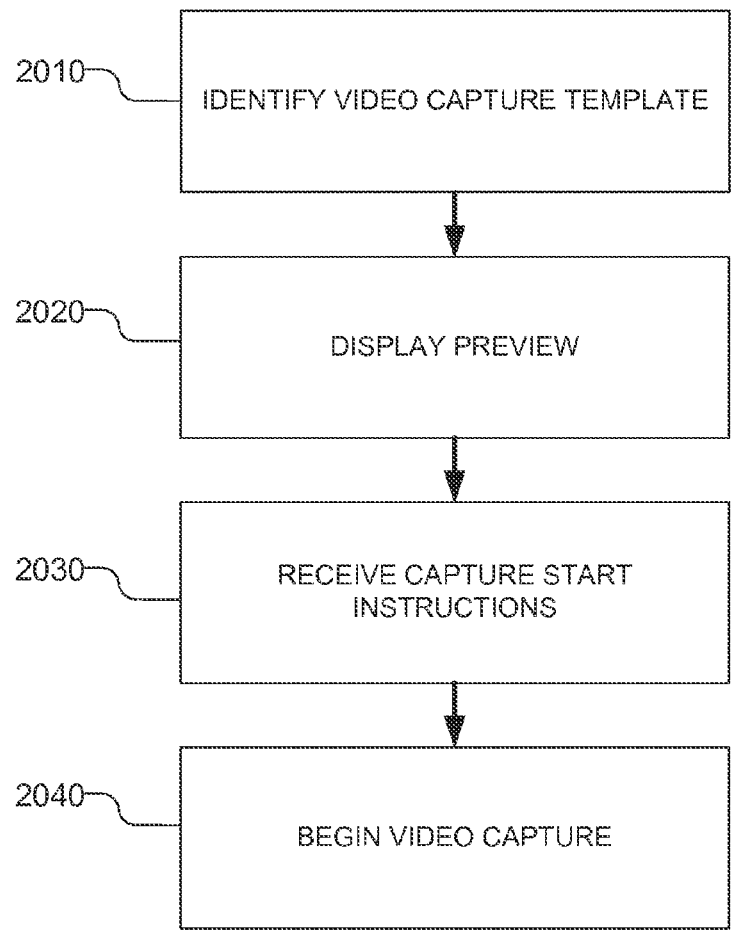
FIG. 2A shows a flowchart of a method of guided video capture according to some examples of the present disclosure.

Turning now to FIG. 2A, an example method 2000 of providing video capture assistance is shown. At operation 2010 a template is identified. This may be based upon either automatic detection of the object based on either a still image or one or more video frames captured prior to starting the video sequence or it may be based upon a user selection. In examples in which the image is automatically detected, this automatic detection may be performed at the video capture device, or at an image processing server. For example, the video capture device may send one or more frames of video or a still image to the image processing server. If the user is selecting the template, the user may be taken to a selection screen in which a list of available templates is shown. The list of available templates may be provided by the image processing service over a network or may be stored on the video capture device (which may store the templates). In some examples both automatic object recognition algorithms and user inputs may be utilized. For example, the video capture device or the image processing service may use the image detection algorithms to narrow down the list of possible templates and then the user may select the template from the narrowed down list.

In some examples, the user may then be shown a preview of the directions in the template at operation 2020 which may show the user the directions prior to actually capturing the video. For example, the skeletal information may be animated as it will be animated during video capture but without actually capturing the video. For directions which are textual, this preview may show the user the list of directions in the template. At operation 2030 the user may indicate that they are ready to start video capture. This indication is then received by the video capture device. At operation 2040 the video capture is then started.

Figure 2B:
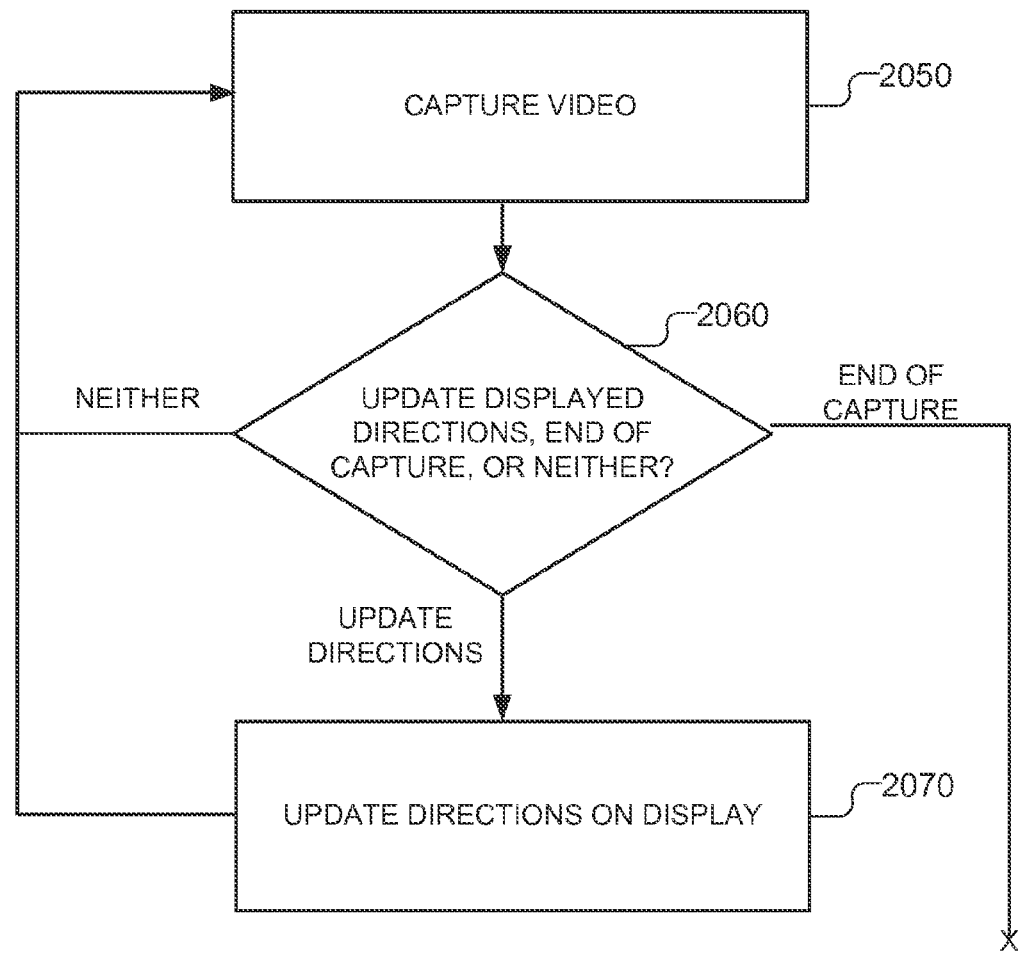
FIG. 2B shows a flowchart of a method of guided video capture according to some examples of the present disclosure.

FIG. 2B shows an example method of video capture. At operation 2050 the device begins capturing the video. At operation 2060 the capture device determines from the template whether the capture sequence or path has ended or whether the directions need updating. This may be based upon analyzing the captured video to determine one or more video parameters (for example, time elapsed, angles of the item viewed, or the like) corresponding to the captured video and comparing those video parameters with the target video parameters of the template. If one of the target video parameters matches the captured video parameters, the displayed direction may be updated to the direction corresponding to the matched target video parameters. For example, if the template has the following:

| Parameter | Direction |
|---|---|
| Time elapsed: 10 s | Rotate model 45 degrees over the next 10 seconds. |
| Time elapsed: 40 s | Zoom model 30% over the next 5 seconds. |
| Time elapsed: 47 s | Display text "say pricing information into microphone" |
| Time elapsed: 60 s | End Capture |

The system may analyze the current video and determine that the captured video parameters include that the current elapsed time is 40 seconds and thus the skeletal representation should be zoomed by 30% over the next 5 seconds (or zoomed 6% every second). Note that while in the example template, the direction was given over a period of time (e.g., zoom 30% over the next 5 seconds), in other example, separate parameters and directions may be used (e.g., there may be 6 separate directions for each second between 40 and 45 seconds, each specifying a zoom of 6%). While in the example template shown above, the video parameter was a time elapsed, in other examples, the video parameter could be time elapsed, time elapsed since the last direction, current object orientation, past object orientations (or a collection of past object orientations—e.g., once the object has had certain viewpoints already shown, show this associated direction), or any combination thereof (e.g., some parameters in the template could be time based, others could be orientation based, or the like). Determining the object orientation with respect to the camera to determine whether one or more goal video parameters are met may be done using one or more of the aforementioned computer vision algorithms, or using an accelerometer, shock sensor, or some other position and/or motion sensor on the video capture device. Determining whether target video parameters are met for audio related parameters may be done based on sound level thresholds (e.g., ensuring that the audio is past a threshold output), based upon comparisons to known sounds using fingerprinting (e.g., comparing a fingerprint calculated from the video's audio to a fingerprint of the desired sound), or the like. Fingerprints may be calculated by sampling audio at various time indexes and determining times and frequencies of peak intensity. Fingerprints of desired sounds may be included in the template and may be compared to the audio captured to determine if the desired sound is present.

If the directions need to be updated (e.g., the model needs to be moved, new text directions need to be displayed, or the like), this is done at operation 2070. Video capture continues at 2050 until the system determines that video capture should end. The system may determine that the video capture sequence has ended in many ways. For example, the system may run out of un-completed directions, a direction may include instructions to the video capture device to stop the capture sequence after a certain event (e.g., at a specific time or at the conclusion of an allotted time), or the like.

Figure 3:
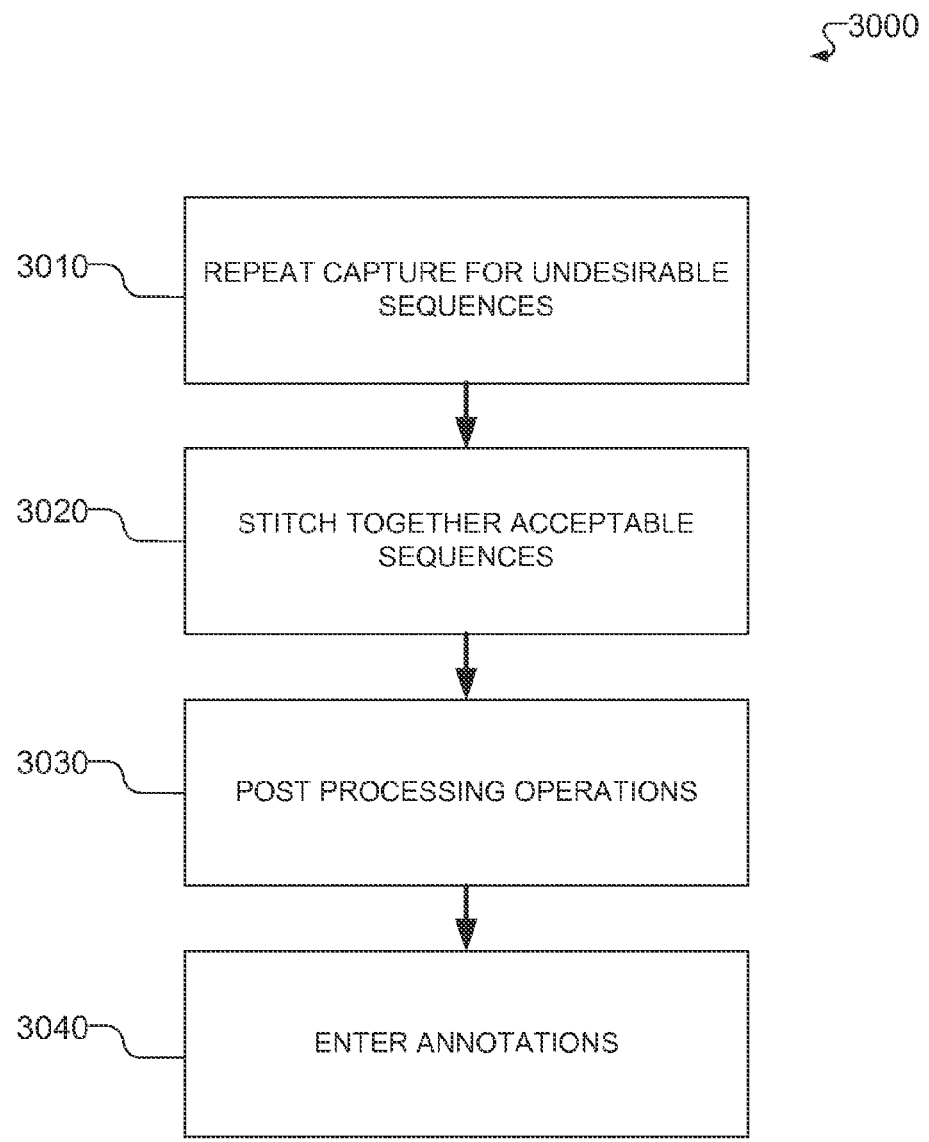
FIG. 3 shows a flowchart of a method of video post-processing according to some examples of the present disclosure.

Turning now to FIG. 3, in some examples, once video capture has ended, the system may determine one or more video segments which need to be recaptured. In these examples, at operation 3010 the video capture from FIG. 2 may be repeated for only those segments needed to be recaptured until the system has acceptable video for each particular segment. At operation 3020, the system may stitch together multiple video files into a final video file which has acceptable segments for the entire video sequence. At operation 3030, the system may do various post processing activities either automatically, or via manual input from the user. Post processing may include adjustments to the contrast, brightness, or other effects to produce a quality video. Other effects may include special effects sequences (e.g., fade in/out, application of sepia effects, color changes, chroma keying, or the like). At operation 3040, the user may be prompted to enter annotations which may appear in the video at a location in the video. The annotations may consist of text, audio, or other video (e.g., a picture in picture annotation) and may describe the portion of the video shown.

In some examples, once the user is satisfied with the video, the user may be prompted to enter listing details, such as price, payment details, item description details, or the like. Part of this information may be pre-filled in for the user by the video capture device as a result of the system determining the item identity as part of the video capture. Once the user is happy with the listing, the listing (along with the video) may be uploaded to a network commerce system.

Figure 4:
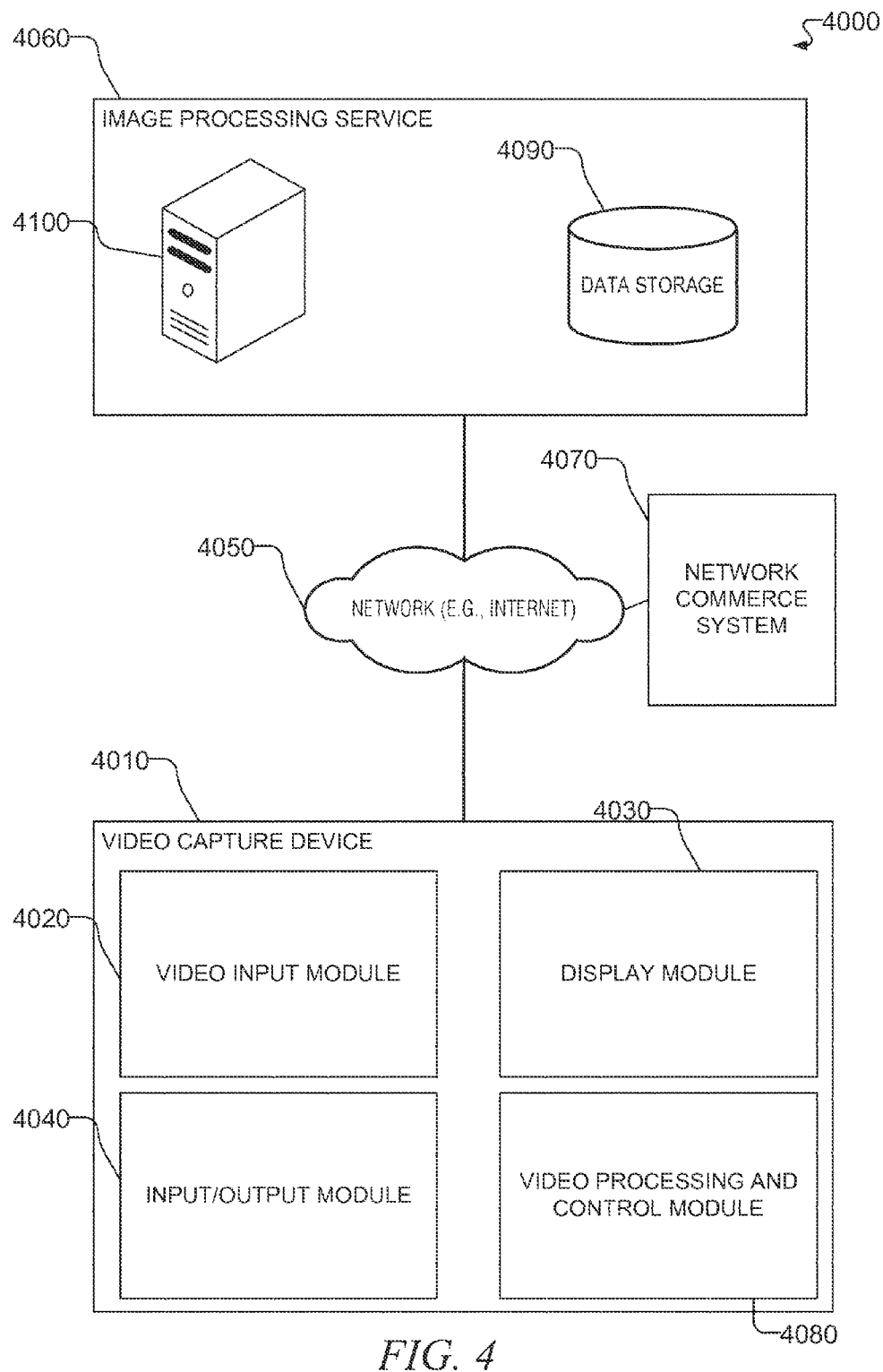
FIG. 4 shows a block diagram of a guided video capture system according to some examples of the present disclosure.

Turning now to FIG. 4, an example video capture system 4000 is shown. Video capture device 4010 may be any computing device capable of providing directions to the user during video capture. Example video capture devices include mobile phones (e.g., a Smartphone, a cell phone or the like), a tablet computer, a desktop computer, a video camera, or the like. The video capture device may include a video input module 4020 which may receive input from an image sensor (such as a charge-coupled device CCD or active pixel sensor such as a complementary metal-oxide semiconductor—CMOS sensor). The image sensor may be integral with the computing device or may be communicatively coupled to it. Video capture device 4010 may have a display module 4030 which may cause images to be displayed on a display device (e.g., a viewfinder and/or a graphical user interface on a display for the user). For example, during video capture, the images received by the video input module may be stored in a storage device communicatively coupled to, or part of, the video capture device 4010, but may also be communicated to the display module 4030 which may cause the image to be displayed on a display module as a view finder. Display module 4030 may also superimpose various menus and other functionality over the viewfinder. For example, display module 4030 may superimpose menus for adjusting video capture parameters such as lighting, contrast, image quality, or the like. Display module 4030 may also superimpose the directions from the template (e.g., the skeletal model or other directions) on the image.

Video capture device 4010 may also have an input/output module 4040 which may receive input from the user and communicate to and from the network commerce system, the image processing service, and other entities through a network 4050. Network 4050 may be or include portions of one or more of the Internet, a Local Area Network (LAN), a Wide Area Network (WAN), a cellular data network (e.g., a 3G or 4G network such as a Long Term Evolution LTE network, or the like), or any other electronic network which enables communication between the video capture device 4010 and the image processing service 4060. For example, the input/output module 4040 may receive input including: an indication that the user wishes to capture video, an indication that the user wishes to utilize a template during video capture, a selection of an image template from the user, an indication that the user is finished capturing video, video capture parameters or adjustments, post-processing commands, listing details, or the like. Input/output module 4040 may also communicate with image processing service 4060 across network 4050. For example, input/output module 4040 may send an image of the product to image processing service 4060 for image recognition and receive the template in response to the sent image. In other examples, the input/output module 4040 may receive a list of available templates and cause them to be displayed to the user (e.g., through the display module 4030) and receive an input from the user as to the user's selection of a template. This template selection may then be communicated to the image processing service 4060 which may return the template. Input/output module 4040 may also communicate with a network commerce system 4070 to submit and manage item listings.

Video capture device 4010 may also have a video processing and control module 4080 which may direct and coordinate the components in template selection, video capture (and display of the directions in the templates), post-processing, creation of listings, communication with the image processing service 4060 and the like. Video processing and control module may also perform video processing functions such as image recognition and computer vision (e.g., determining the identity of an item depicted in an image), image processing (e.g., adjustments to the image such as contrast and brightness, stitching portions of video together, assessing how close the video is to the template), or the like.

Image processing service 4060 may be a service accessible over a network which may store templates for video capture and may have video processing capabilities such as image recognition and computer vision (e.g., determining the identity of an item depicted in an image), image processing (e.g., adjustments to the image such as contrast and brightness, stitching portions of video together, assessing how close the video is to the template), or the like. Image processing service 4060 may have data storage 4090 which may store video templates, still images of products (e.g., training data for computer learning techniques to use in image recognition algorithms) or the like. Image processing service 4060 may have one or more computing devices 4100 that may send a list of templates stored in the data storage 4090 upon receiving a request from a video capture device (e.g., video capture device 4010). Computing devices 4100 may also perform video processing functions in response to a request from a video capture device 4010.

Both the image processing service 4060 and the video capture device 4010 may communicate with network commerce system 4070 which will be described in FIG. 5. While the video input module 4020, input/output module 4040, display module 4030 and video processing and control module 4080 are shown as part of the video capture device 4010, one skilled in the art with the benefit of Applicant's disclosure will appreciate that these functions may be distributed across any number of hardware resources (e.g., separate computing devices) that are communicatively coupled. For example, the video input module may send video across a bus, network, or other communication interface to the display module, the input/output module, the video processing and control module, or the like.

Note that while the system heretofore described has been applied to video, the methods, systems, and machine-readable media of this disclosure may also apply to still images. The template may provide directions for properly capturing still images which may be overlaid on the still camera's viewfinder. Thus an image capture device may be substituted for the video capture device.

Additionally, one or more still photos can be extracted from captured video. These stills can be generated from frame extraction of the video at certain key points, such as when directions in the template (e.g., the three dimensional item skeleton) are overlaid with key points in the object, thus increasing the quality of still pictures on the listings. The points in the video to capture for use as stills may be controlled by the user (e.g., manually determining when the best matches between the directions and the captured frame), or may be automatically determined based upon image recognition and computer vision algorithms.

Figure 5:
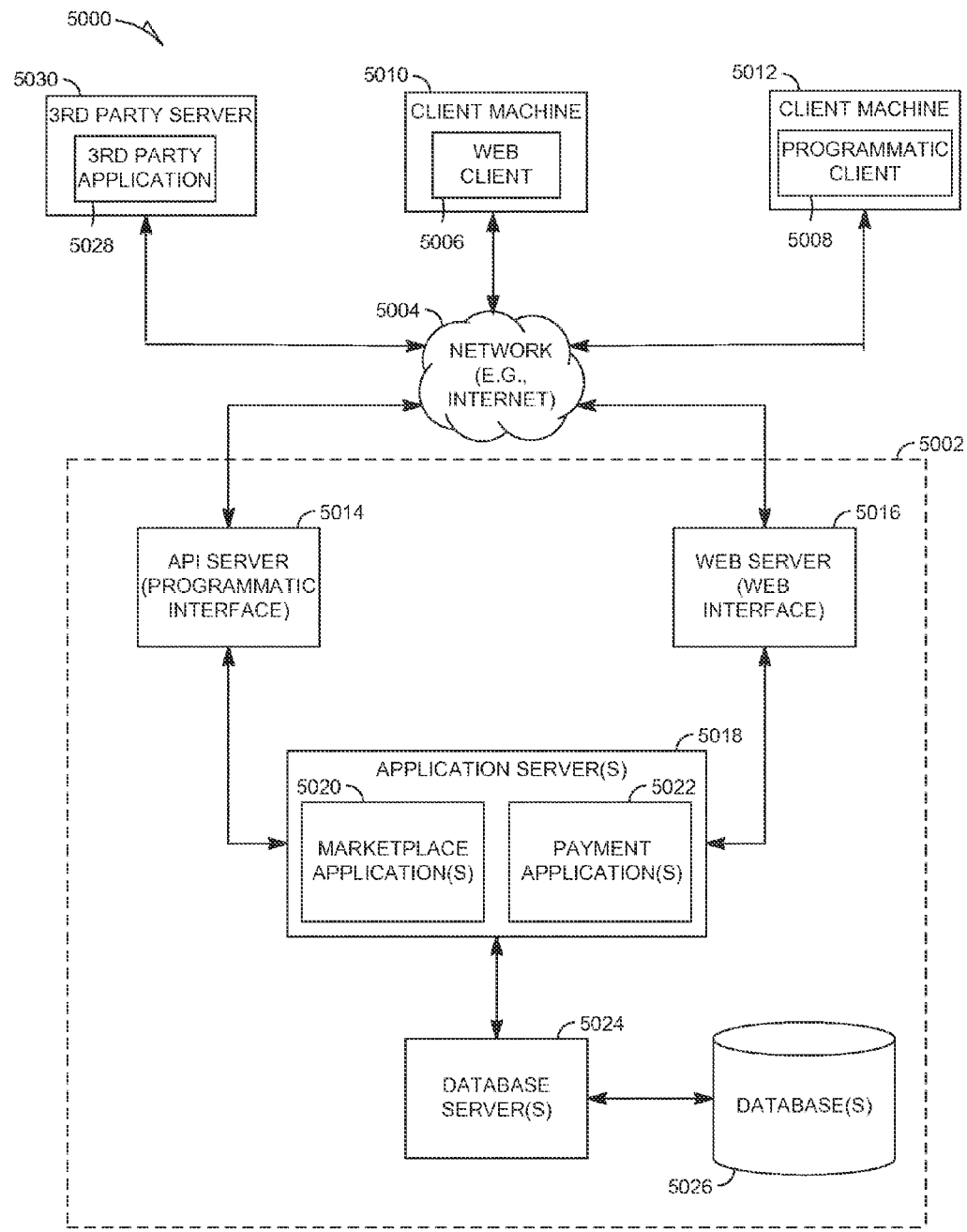
FIG. 5 shows a block diagram of a network commerce system according to some examples of the present disclosure.

FIG. 5 is a network diagram depicting a client-server system 5000, within which example embodiments may be deployed. A networked system 5002, in the example forms of a network-based marketplace or publication system, provides server-side functionality, via a network 5004 (e.g., the Internet or Wide Area Network (WAN)) to one or more clients. FIG. 5 illustrates, for example, a web client 5006 (e.g., a browser, such as the Internet Explorer browser developed by Microsoft Corporation of Redmond. Washington State), and a programmatic client 5008 executing on respective client machines 5010 and 5012.

An Application Program Interface (API) server 5014 and a web server 5016 are coupled to, and provide programmatic and web interfaces respectively to, one or more application servers 5018. The application servers 5018 host one or more marketplace applications 5020 and payment applications 5022. The application servers 5018 are, in turn, shown to be coupled to one or more databases servers 5024 that facilitate access to one or more databases 5026.

The marketplace applications 5020 may provide a number of marketplace functions and services to users that access the networked system 5002. For example, marketplace applications 5020 may provide one or more background images. The payment applications 5022 may likewise provide a number of payment services and functions to users. The payment applications 5022 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 5020. While the marketplace and payment applications 5020 and 5022 are shown in FIG. 5 to both form part of the networked system 5002, it will be appreciated that, in alternative embodiments, the payment applications 5022 may form part of a payment service that is separate and distinct from the networked system 5002.

Further, while the system 5000 shown in FIG. 5 employs a client-server architecture, the present invention is of course not limited to such an architecture, and could equally well find application in a distributed, or peer-to-peer, architecture system, for example. The various marketplace and payment applications 5020 and 5022 could also be implemented as standalone software programs, which do not necessarily have networking capabilities.

The web client 5006 accesses the various marketplace and payment applications 5020 and 5022 via the web interface supported by the web server 5016. Similarly, the programmatic client 5008 accesses the various services and functions provided by the marketplace and payment applications 5020 and 5022 via the programmatic interface provided by the API server 5014. The programmatic client 5008 may, for example, be a seller application (e.g., the TurboLister application developed by eBay Inc., of San Jose, Calif.) to enable sellers to author and manage listings on the networked system 5002 in an off-line manner, and to perform batch-mode communications between the programmatic client 5008 and the networked system 5002. In some examples, the client machine may be or include all or portions of the video capture device 4010 from FIG. 4 or one or more of the functions thereof. The programmatic client 5008 may be a seller application. In some examples, the programmatic client 5008 may execute a client application, which may provide functionality as described in FIGS. 1-4. In other examples, the client machine 5010, 5012 may be buyer machines which access the networked system 5002 to buy products.

FIG. 5 also illustrates a third party application 5028, executing on a third party server machine 5030, as having programmatic access to the networked system 5002 via the programmatic interface provided by the API server 5014. For example, the third party application 5028 may, utilizing information retrieved from the networked system 5002, support one or more features or functions on a website hosted by the third party. The third party website may, for example, provide one or more promotional, marketplace or payment functions that are supported by the relevant applications of the networked system 5002. In other examples, the third party server machine 5030 may provide one or more templates used in examples described herein, for example the third party server machine 5030 may implement the functionality of the image processing service.

In other examples, the functions of the image processing service may be implemented in one of the application servers of the networked system 5002.

One skilled in the art with the benefit of Applicants' disclosure will appreciate that although the examples described herein utilized an application executing on a particular client machine 5012, the functionality described may be distributed across a plurality of machines which may be connected by a network. For example, some of the functionality may be performed by a network server (e.g., a server in the networked system 5002).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 6:
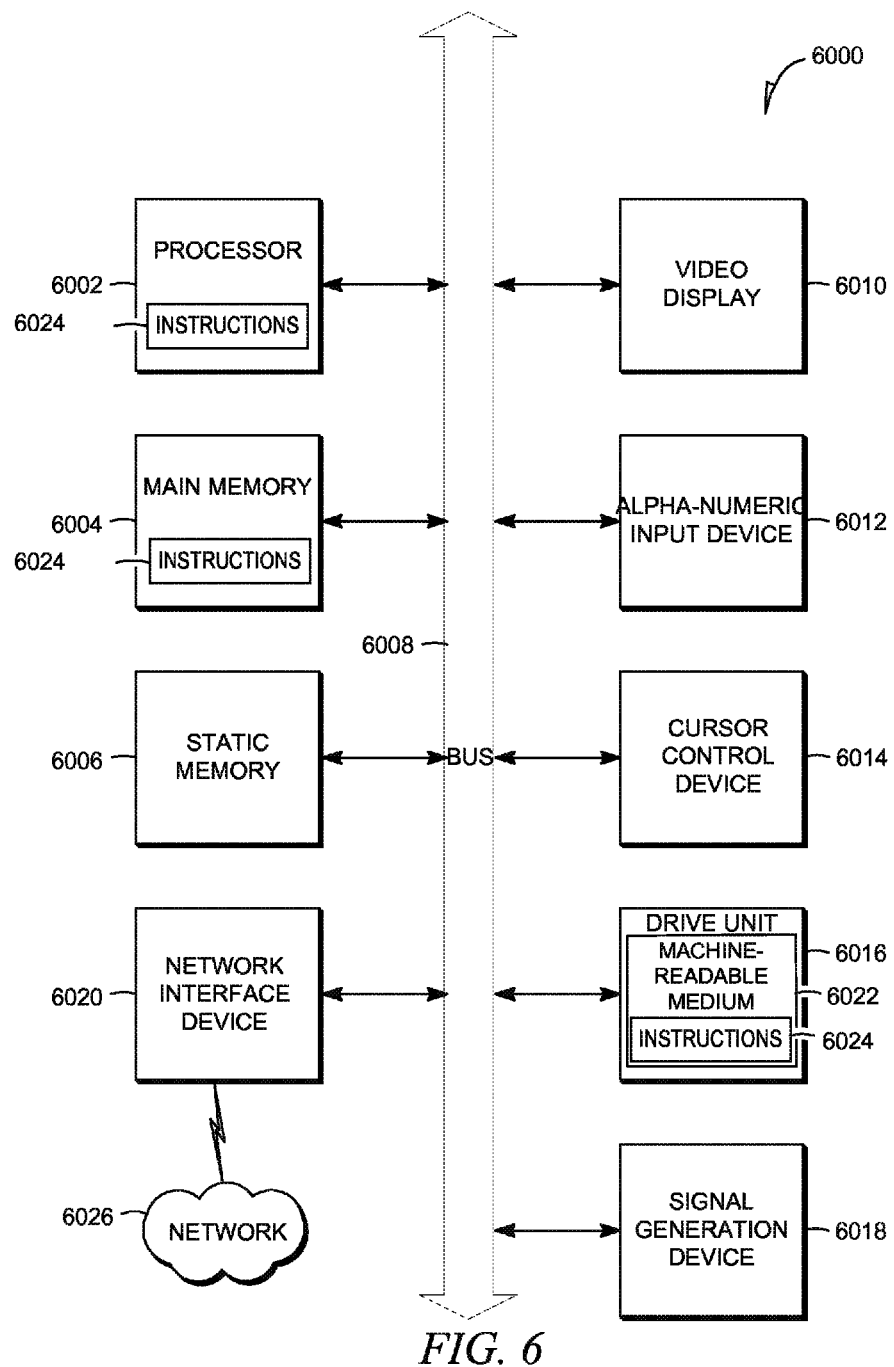
FIG. 6 shows a block diagram of a machine according to some examples of the present disclosure.

FIG. 6 is a block diagram of machine in the example form of a computer system 6000 within which instructions, for causing the machine to perform any one or more of the methodologies discussed herein, may be executed. For example, any one of the components shown in FIGS. 4-5 may be or contain one or more of the components described in FIG. 6. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a notebook PC, a docking station, a wireless access point, a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The machine may contain components not shown in FIG. 6 or only a subset of the components shown in FIG. 6.

The example computer system 6000 includes a processor 6002 (e.g., a central processing unit (CPU), a graphics processing unit (GPU) or both), a main memory 6004 and a static memory 6006, which communicate with each other via a bus 6008. The computer system 6000 may further include a video display unit 6010 (e.g., a liquid crystal display (LCD) or a cathode ray tube (CRT)). The computer system 6000 also includes an alphanumeric input device 6012 (e.g., a keyboard), a user interface (UI) navigation device 6014 (e.g., a mouse), a disk drive unit 6016, a signal generation device 6018 (e.g., a speaker) and a network interface device 6020.

Machine-Readable Medium

The disk drive unit 6016 includes a machine-readable medium 6022 on which is stored one or more sets of instructions and data structures (e.g., software) 6024 embodying or used by any one or more of the methodologies or functions described herein. The instructions 6024 may also reside, completely or at least partially, within the main memory 6004, static memory 6006, and/or within the processor 6002 during execution thereof by the computer system 6000, the main memory 6004 and the processor 6002 also constituting machine-readable media.

While the machine-readable medium 6022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 6024 may further be transmitted or received over a communications network 6026 using a transmission medium. The instructions 6024 may be transmitted using the network interface device 6020 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software. Network interface 6020 may wirelessly transmit data and may include an antenna.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

OTHER EXAMPLES

Example 1

A method of guided video capture, the method comprising: identifying a video capture template, the video capture template including a plurality of target video parameters, each of the target video parameters corresponding to one of a plurality of video capture directions; while capturing video, selecting a video capture direction from the plurality of video capture directions based on video parameters of captured video and the plurality of target video parameters using a processor, and presenting the selected video capture direction to a user on a display device.

Example 2

The method of example 1, wherein the presenting the selected video capture direction includes overlaying a skeletal representation of an object appearing in the captured video, the skeletal representation providing orientation information to the user.

Example 3

The method of example 2, wherein the overlaying the skeletal representation of the object includes transforming the skeletal representation of the object in accordance with at least one of the plurality of video capture directions.

Example 4

The method of any one of examples 1-3, wherein identifying the video capture template includes: providing a list of templates on the display; and receiving input identifying the video capture template.

Example 5

The method of any one of examples 1-4, further includes, while capturing the video: displaying, in substantially real-time, the video on the display device; and overlaying, on the display device, at least a portion of the plurality of video capture directions.

Example 6

The method of any one of examples 1-5, wherein the selecting the video capture direction is based upon determining that the video parameters of the captured video satisfy the target video parameters corresponding to the video capture direction.

Example 7

The method of any one of examples 1-6, wherein the target video parameters include one of: an elapsed time and a time offset from a previous video capture direction.

Example 8

The method of any one of examples 1-7, wherein the target video parameters include a desired position of an object appearing in the captured video.

Example 9

The method of any one of examples 1-8, wherein one of the plurality of target video parameters is an audio parameter.

Example 10

The method of any one of examples 1-9, wherein one of the plurality of video capture directions is an audio direction.

Example 11

A video capture device comprising: a video processing and control module configured to: identify a video capture template, the video capture template including a plurality of target video parameters, each of the target video parameters corresponding to one of a plurality of video capture directions; while capturing video, select a video capture direction from the plurality of video capture directions based on video parameters of captured video and the plurality of target video parameters using a processor; and a display module configured to: present the selected video capture direction to a user on a display device.

Example 12

The video capture device of example 11, wherein the display module is configured to present the selected video capture direction by at least overlaying a skeletal representation of an object appearing in the captured video, the skeletal representation providing orientation information to the user.

Example 13

The video capture device of example 12, wherein the overlaying the skeletal representation of the object includes transforming the skeletal representation of the object in accordance with at least one of the plurality of video capture directions.

Example 14

The video capture device of any one of examples 11-13, wherein the video processing and control module is configured to identify the video capture template by at least: providing a list of templates on the display through the display module; and receiving input from an input module identifying the video capture template.

Example 15

The video capture device of any one of examples 11-14, wherein the display module is further configured to, while capturing the video: display, in substantially real-time, the video on the display device; and overlay, on the display device, at least a portion of the plurality of video capture directions.

Example 16

The video capture device of any one of examples 11-15, wherein the video processing and control module selects the video capture direction based upon determining that the video parameters of the captured video satisfy the target video parameters corresponding to the video capture direction.

Example 17

The video capture device of any one of examples 11-16, wherein the target video parameters include one of: an elapsed time and a time offset from a previous video capture direction.

Example 18

The video capture device of any one of examples 11-17, wherein the target video parameters include a desired position of an object appearing in the captured video.

Example 19

The video capture device of any one of examples 11-18, wherein one of the plurality of target video parameters is an audio parameter.

Example 20

The video capture device of any one of examples 11-19, wherein one of the plurality of video capture directions is an audio direction.

Example 21

A machine-readable medium that stores instructions which when performed by a machine, cause the machine to perform operations comprising: identifying a video capture template, the video capture template including a plurality of target video parameters, each of the target video parameters corresponding to one of a plurality of video capture directions; while capturing video, selecting a video capture direction from the plurality of video capture directions based on video parameters of captured video and the plurality of target video parameters using a processor and presenting the selected video capture direction to a user on a display device.

Example 22

The machine-readable medium of example 21, wherein the instructions for presenting the selected video capture direction includes instructions, which when performed by the machine cause the machine to at least overlay a skeletal representation of an object appearing in the captured video, the skeletal representation providing orientation information to the user.

Example 23

The machine-readable medium of example 22, wherein the instructions for overlaying the skeletal representation of the object includes instructions, which when performed by the machine, cause the machine to transform the skeletal representation of the object in accordance with at least one of the plurality of video capture directions.

Example 24

The machine-readable medium of any one of examples 21-23, wherein the instructions for identifying the video capture template include instructions which when performed by the machine cause the machine to: provide a list of templates on the display; and receive input identifying the video capture template.

Example 25

The machine-readable medium of any one of examples 21-24, wherein the instructions include instructions, which when performed by the machine, cause the machine to display the captured video in substantially real time on the display device along with the presented directions.

Example 26

The machine-readable medium of any one of examples 21-25, wherein the instructions for selecting the video capture direction include instructions which when performed by the machine cause the machine to select the video capture direction based upon determining that the video parameters of the captured video satisfy the target video parameters corresponding to the video capture direction.

Example 27

The machine-readable medium of any one of examples 21-26, wherein the target video parameters include one of: an elapsed time and a time offset from a previous video capture direction.

Example 28

The machine-readable medium of any one of examples 21-27, wherein the target video parameters include a desired position of an object appearing in the captured video.

Example 29

The machine-readable medium of any one of examples 21-28, wherein one of the plurality of target video parameters is an audio parameter.

Example 30

The machine-readable medium of any one of examples 21-29, wherein one of the plurality of video capture directions is an audio direction.

What is claimed is:

1. A method of guided video capture, the method comprising:
   using one or more hardware processors:
   identifying a video capture template, the video capture template defining a video capture sequence including a plurality of video segments for an object, each video segment including a target video parameter and associated video capture direction;
   while capturing video of the object, identifying a video segment from the plurality of video segments in response to a target parameter for the video segment being met by a parameter of the video being captured, the target parameter comprising at least one of time elapsed, an orientation of the object, a past object orientation, and an audio parameter; and presenting a video capture direction associated with the target video parameter of the identified video segment to a user on a display device.

2. The method of claim 1, wherein presenting the video capture direction includes overlaying a skeletal representation of an object over the captured video on the display device, the skeletal representation providing orientation information to the user.

3. The method of claim 2, wherein overlaying the skeletal representation of the object includes transforming the skeletal representation of the object in accordance with the video capture direction.

4. The method of claim 1, wherein identifying the video capture template includes:
   providing a list of templates on the display; and
   receiving input identifying the video capture template.

5. The method of claim 1, further includes, while capturing the video:
   displaying, in substantially real-time, the video on the display device; and
   overlaying, over the captured video, on the display device, at least a portion of the video capture direction.

6. The method of claim 1, wherein at least one of the target video parameters is one of: an elapsed time and a time offset.

7. The method of claim 1, wherein at least one of the target video parameters is a desired position of an object appearing in the captured video.

8. The method of claim 1, wherein at least one of the plurality of target video parameters is an audio parameter.

9. The method of claim 1, wherein at least one of the video capture directions is an audio direction.

10. The method of claim 1, comprising:
    determining that a particular video segment of the plurality of video segments does not meet its associated target parameter;
    recapturing the particular video segment to create a recaptured video segment; and
    replacing, in the captured video, the particular video segment with the recaptured video segment.

11. A video capture device comprising:
    a video processing and control module configured to:
    identify a video capture template, the video capture template defining a video capture sequence including a plurality of video segments for an object, each video segment including a target video parameter and associated video capture direction;
    while capturing video of the object,
    identifying a video segment from the plurality of video segments in response to a target parameter for the video segment being met by a parameter of the video being captured, the target parameter comprising at least one of time elapsed, an orientation of the object, a past object orientation, and an audio parameter; and
    a display module configured to: present a video capture direction associated with the target video parameter of the identified video segment to a user on a display device.

12. The video capture device of claim 11, wherein the display module is configured to present the selected video capture direction by at least overlaying a skeletal representation of an object over the captured video on the display device, the skeletal representation providing orientation information to the user.

13. The video capture device of claim 12, wherein overlaying the skeletal representation of the object includes transforming the skeletal representation of the object in accordance with the video capture direction.

14. The video capture device of claim 11, wherein the video processing and control module is configured to identify the video capture template by at least:
    providing a list of templates on the display through the display module; and
    receiving input from an input module identifying the video capture template.

15. The video capture device of claim 11, wherein the display module is further configured to, while capturing the video:
    display, in substantially real-time, the video on the display device; and
    overlay, over the captured video, on the display device, at least a portion of the video capture direction.

16. The video capture device of claim 11, wherein at least one of the target video parameters is: an elapsed time and a time offset.

17. The video capture device of claim 11, wherein at least one of the target video parameters is a desired position of an object appearing in the captured video.

18. The video capture device of claim 11, wherein at least one of the target video parameters is an audio parameter.

19. The video capture device of claim 11, wherein at least one of the video capture directions is an audio direction.

20. The video capture device of claim 11, wherein the video processing and control module is configured to:
    determine that a particular video segment of the plurality of video segments does not meet its associated target parameter;
    recapture the particular video segment to create a recaptured video segment; and
    replacing the captured video, the particular video segment with the recaptured video segment.

21. A non-transitory machine-readable medium that stores instructions which when performed by a machine, cause the machine to perform operations comprising:
    identifying a video capture template, the video capture template defining a video capture sequence including a plurality of video segments for an object, each video segment including a target video parameter and associated video capture direction;

while capturing video, identifying a video segment from the plurality of video segments in response to a target parameter for the video segment being met by a parameter of the video being captured, the target parameter comprising at least one of time elapsed, an orientation of the object, a past object orientation, and an audio parameter; and presenting a video capture direction associated with the target video parameter of the automatically identified video segment to a user on a display device.

22. The non-transitory machine-readable medium of claim 21, wherein the operations of presenting the selected video capture direction comprise overlaying a skeletal representation of an object over the captured video on the display device, the skeletal representation providing orientation information to the user.

23. The non-transitory machine-readable medium of claim 22, wherein the operations of overlaying the skeletal representation of the object comprise transforming the skeletal representation of the object in accordance with the video capture direction.

24. The non-transitory machine-readable medium of claim 21, wherein the operations of identifying the video capture template comprise:
providing a list of templates on the display; and
receiving input identifying the video capture template.

25. The non-transitory machine-readable medium of claim 21, wherein the operations comprise displaying the captured video in substantially real time on the display device and overlaying over the captured video on the display device at least a portion of the video capture direction.

26. The non-transitory machine-readable medium of claim 21, wherein at least one of the target video parameters is one of: an elapsed time and a time offset.

27. The non-transitory machine-readable medium of claim 21, wherein at least one of the target video parameters is a desired position of an object appearing in the captured video.

28. The non-transitory machine-readable medium of claim 21, wherein at least one of the target video parameters is an audio parameter.

29. The non-transitory machine-readable medium of claim 21, wherein at least one of the plurality of video capture directions is an audio direction.

30. The non-transitory machine-readable medium of claim 21, wherein the operations comprise:
determining that a particular video segment of the plurality of video segments does not meet its associated target parameter;
recapturing the particular video segment to create a recaptured video segment; and
replacing, in the captured video, the particular video segment with the recaptured video segment.

* * * * *